US008566350B2

(12) United States Patent
Chow et al.

(10) Patent No.: US 8,566,350 B2
(45) Date of Patent: *Oct. 22, 2013

(54) METHOD AND APPARATUS FOR FACILITATING DOCUMENT SANITIZATION

(75) Inventors: Richard Chow, Sunnyvale, CA (US); Jessica N. Staddon, Redwood City, CA (US); Ian S. Oberst, Dexter, OR (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1024 days.

This patent is subject to a terminal disclaimer.

(21) Appl. No.: 12/610,840

(22) Filed: Nov. 2, 2009

(65) Prior Publication Data
US 2011/0107205 A1 May 5, 2011

(51) Int. Cl.
*G06F 17/30* (2006.01)

(52) U.S. Cl.
USPC ........... 707/780; 707/692; 707/694; 707/695; 726/1; 726/25

(58) Field of Classification Search
None
See application file for complete search history.

(56) References Cited

U.S. PATENT DOCUMENTS

| 8,271,483 B2 * | 9/2012 | Staddon et al. ............... 707/730 |
| 2005/0004922 A1 * | 1/2005 | Zernik ........................... 707/100 |
| 2006/0005247 A1 * | 1/2006 | Zhang et al. ................... 726/26 |
| 2006/0075228 A1 * | 4/2006 | Black et al. ................... 713/167 |
| 2006/0272024 A1 * | 11/2006 | Huang et al. ................... 726/26 |
| 2007/0030528 A1 * | 2/2007 | Quaeler et al. ................ 358/453 |
| 2007/0038437 A1 * | 2/2007 | Brun ................................ 704/9 |
| 2007/0061384 A1 * | 3/2007 | Harrington et al. ........... 707/203 |
| 2007/0162749 A1 * | 7/2007 | Lim ............................. 713/167 |
| 2008/0243825 A1 * | 10/2008 | Staddon et al. ................... 707/5 |
| 2008/0250007 A1 * | 10/2008 | Masuyama et al. ............... 707/5 |
| 2009/0070101 A1 * | 3/2009 | Masuyama et al. ............... 704/9 |
| 2010/0076957 A1 * | 3/2010 | Staddon et al. ............... 707/722 |

OTHER PUBLICATIONS

Zhu, et al., Deriving Private Information from Association Rule Mining Results, IEEE 2009.*
Yee, George, Visual Analysis of Privacy Risks in Web Services, IEEE 2007.*
Wright, et al., An Artificial Intelligence Schema to Perform Automatic Sanitization of Data, IEEE 1987.*

* cited by examiner

*Primary Examiner* — Neveen Abel Jalil
*Assistant Examiner* — Kristofer Biskeborn
(74) *Attorney, Agent, or Firm* — Shun Yao; Park, Vaughan, Fleming & Dowler LLP (57) ABSTRACT

One embodiment provides a system for facilitating sanitizing a modified version of a document relative to one or more sensitive topics. During operation, the system determines a privacy risk for a term in the modified version relative to the sensitive topics, wherein the privacy risk measures the extent to which the sensitive topic(s) can be inferred based on the term. Next, the system determines an information utility and privacy loss or gain for the modified version, where the information utility reflects the extent to which the modified version has changed and the privacy loss or gain reflects the extent to which the modified version is reduced in sensitivity.

21 Claims, 6 Drawing Sheets

METHOD AND APPARATUS FOR FACILITATING DOCUMENT SANITIZATION

BACKGROUND

1. Field

The present disclosure relates generally to facilitating revision of a document. More specifically, the present disclosure relates to a method for facilitating revision of sensitive content in a document.

2. Related Art

Organizations often need to distribute documents containing sensitive information. For example, government organizations often need to release documents in compliance with the Freedom of Information Act (FOIA). Such organizations typically redact sensitive information by blacking-out or obscuring the sensitive information.

On one hand, redacting too little information can lead to the inference of the sensitive information. A redacted word can sometimes be inferred from its length, its font characteristics, and its association with other words appearing in the document. For example, the terms "carpenter," "Star Wars," "Air Force One," and "Indiana Jones" can be used to infer "Harrison Ford." (Harrison Ford supported himself as a carpenter in Los Angeles before being discovered and starred in "Star Wars," "Air Force One," and "Indiana Jones.") On the other hand, redacting too much information can lead to a meaningless document.

Current approaches to redaction remove too much information or do not remove enough information. Moreover, current approaches to redaction do not offer an appropriate division of labor between humans and machines. Fully automated methods lack the knowledge to discriminate among potential terms to redact. Fully manual methods place too much of the burden on humans to estimate the effects of redaction.

SUMMARY

One embodiment provides a system for facilitating sanitizing a modified version of a document relative to one or more sensitive topics. During operation, the system determines a privacy risk for a term in the modified version relative to the sensitive topic(s), where the privacy risk measures the extent to which the sensitive topics can be inferred based on the term. Next, the system indicates via a user interface an information utility and privacy loss or gain for the modified version, where the information utility reflects the extent to which the modified version has changed and the privacy loss or gain reflects the extent to which the modified version is reduced in sensitivity.

In some embodiments, determining the privacy risk for the term involves determining a confidence measure $c_s(t_1)$ for a term $t_1$ in the modified version of the document relative to sensitive topics s. $t_1$ ranges over all terms in the document, and $c_s(t_1)$ indicates a ratio of a first number of documents, in a corpus, which contain $t_1$ and s, to a second number of documents. Furthermore, the privacy risk is associated with all the $c_s(t_1)$ values.

In some embodiments, the system determines $c_s(t_2)$, where $t_2$ is a term in the modified version different from $t_1$; determines $c_s(t_1 \wedge t_2)$; determines that $c_s(t_1 \wedge t_2) > \max(c_s(t_1), c_s(t_2))$; and displays $t_2$ in association with $t_1$.

In some embodiments, determining the information utility and privacy loss or gain involves determining a change in a risk of the sensitive topic being inferred by the modified version of the document by determining $$\sum_{o \in O} c_s(o) - \sum_{m \in M} c_s(m),$$

where O is a set of terms in the document and M is a set of terms in the modified version; determining a risk removal bonus by determining $$\sum_{d \in D} c_s(d) - \text{threshold},$$

where D is the set of terms deleted from the document and threshold is a constant; determining an overall deletion penalty by determining min(h, 0), where h is the number of terms that have been removed from the document; and determining a score based on a sum of the change in the risk, the risk removal bonus, and the overall deletion penalty, where determining the score involves determining $c_s(t)$ over all terms t in the document.

In some embodiments, the system highlights $t_1$ in the modified version with a color gradient which varies in proportion to $c_s(t_1)$.

In some embodiments, the system determines a guide value for term $t_3$ in the modified version by determining $$\sum_{t_4 \neq t_3 \in M} [c_s(t_3) - c_s(t_3 \wedge t_4)],$$

where M is a set of terms in the modified version; and directing attention to those terms in the modified version which have a high guide value.

In some embodiments, the corpus includes web pages.

In some embodiments, the system determines a hypernym for a term in the modified version, and suggests the hypernym as a replacement for the term.

BRIEF DESCRIPTION OF THE FIGURES

In the figures, like reference numerals refer to the same figure elements.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

DETAILED DESCRIPTION

Overview

Current approaches to redaction remove too much information or do not remove enough information because they ignore strong associations between certain terms and the sensitive information. Moreover, current approaches to redaction do not offer an appropriate division of labor between humans and machines. For example, current approaches do not exploit a machine's ability to calculate various document and term measures and a human's ability to recognize when a document has been redacted too much or too little.

Embodiments of the present invention enable a user to sanitize a document to preserve both privacy and information utility. Sanitization is a generalization of redaction in which sensitive terms are replaced by less sensitive terms but that still convey useful information, instead of blacking out or obscuring the terms. For example, consider the sentence, "The subject was born in Panama and currently resides in zip code 94304." Releasing the subject's zip code and ethnicity might be a privacy concern, since according to the 2000 U.S. Census, only a single person exists who was born in Panama and who resides in zip code 94304. Note that redacting those attributes results in the following text, which has little information utility: "The subject was born in ▮ and currently resides in the ▮ zip code."

Alternatively, the following sanitized version "The subject was born in Central America and currently resides in Santa Clara County, Calif." increases privacy because the attributes "Santa Clara County" and "Central America" match with more than 12,000 people according to the 2000 U.S. Census. Moreover, the sanitized version preserves more of the information in the original sentence.

Embodiments of the present invention enable a user to enter one or more sensitive topics and then alert the user to terms (i.e., words or phrases) that can be used to infer the one or more sensitive topics. Embodiments of the present invention also provide tools to help the user edit the document, look-up the context of sensitive information, and to find word replacements that can reduce privacy risk.

Sanitization can require consideration of other terms in the document. For example, suppose a document states that a person resides in Portland, Oreg. If for privacy reasons, residence should not be specified so precisely, "Portland, Oreg." could be replaced with "Portland" (a popular U.S. city name) or "Oregon". However, if another sentence in the document refers to the region's "temperate climate," then Oregon is a more privacy-preserving replacement. In contrast, if another sentence in the document refers to the residence city as "the largest in the state," the term "Portland" may be a better replacement because it does not enable someone to infer that the residence city is Portland, Oreg. (i.e., both Portland, Me. and Portland, Oreg. are the largest cities in their respective states).

Embodiments of the present invention can leverage data mining and linguistic parsing technologies to automate such consideration of other terms when trading off privacy against risk. In particular, embodiments of the present invention can use association mining to identify terms in the document that are likely to allow a sensitive topic to be inferred, and are thus a privacy risk.

Embodiments of the present invention can provide the results of that association mining to the user in a visual form so that that the user can rapidly assess the value of a revision relative to a sensitive topic. For example, embodiments of the present invention can highlight the relationship of each term to the sensitive topic using a color gradient.

Embodiments of the present invention can provide a game-like incentive to guide the user toward potential improvements in privacy while retaining as much information in the document as possible. For example, a scoring mechanism can discourage the user from broadly redacting terms to reduce privacy risk (and thus diminishing the utility of the document). The user can see a score, which increases with revisions that reduce the privacy risk of the document, but decreases with word deletions. This method of interaction enables the user to follow a gradient in the space of sanitized terms toward a point in the space with the best tradeoff between privacy and risk.

Embodiments of the present invention can guide the user to terms with the most privacy risk and suggest potentially less sensitive terms such as hypernyms, available from WordNet® and Google Directory.

WordNet® is a large lexical database of English, which groups nouns, verbs, adjectives and adverbs into sets of cognitive synonyms (synsets), each expressing a distinct concept. Synsets are interlinked by means of conceptual-semantic and lexical relations. The resulting network of meaningfully related words and concepts can be navigated with the browser.

Google Directory is a searchable directory based on the Open Directory Project (www.dmoz.org), combined with Google's PageRank® algorithm within each category. Human volunteer subject-matter experts contribute to the Open Directory Project by evaluating, classifying, and annotating each entry. The entries are then ranked by Google's PageRank® algorithms. Google organizes the Directory into categories that are classifications of pages by subjects. The Directory is similar to the table of contents in a book.

In addition to the government applications already mentioned, embodiments of the present invention can be useful in litigation, financial due diligence and for an end-user who wants to maintain an anonymous blog.

The system can facilitate interactive document sanitization through a user interface that enables the user to modify the document, view confidence measures for terms, view document scores, and view linked terms (see below for a definition of linked terms). Note that a modified version of a document is a document where the user has made modifications. A modification can include the removal of a term or the replacement of a term with a hypernyms. Note that the document itself is a modified version of the document without any changes.

Overall System Operation

Figure 1:
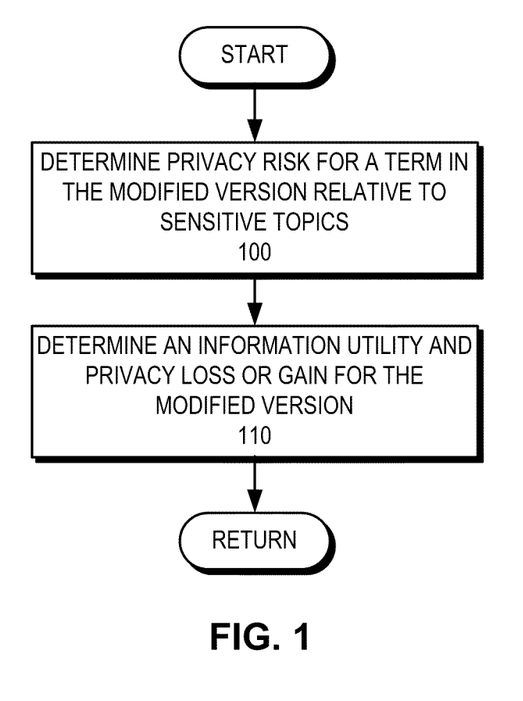
FIG. 1 presents a flow chart illustrating the process of facilitating sanitizing a modified version of a document relative to sensitive topic(s) in accordance with an embodiment.

FIG. 1 presents a flow chart illustrating the process of facilitating sanitizing a modified version of a document relative to sensitive topics in accordance with an embodiment. During operation, the system determines a privacy risk for a term in the modified version relative to the sensitive topics (operation 100). The privacy risk captures a relationship between the term and the sensitive topic. The system can repeat operation 100 over all terms in the modified version. Note that a term or sensitive topic can be any word, word-fragment, phrase, sentence, or paragraph in the modified version of the document. The sensitive topics can include one or more terms.

Next, the system determines an information utility and privacy loss or gain for the modified version of the document (operation 110). The information utility reflects the extent to which the modified version has changed. For example, the changes might include a loss of information from deleted words or an increase in the generality of words by replacing a word with its hypernym. The privacy loss or gain reflects the extent to which the modified version is reduced in sensitivity. That is, the privacy loss or gain reflects change in the extent to which the sensitive topics can be inferred.

Determining Term Confidence

As difficult as it is to detect privacy breaches, the problem of conveying privacy risk to the user is perhaps even more challenging. It is particularly acute in the case of text content where the combination of seemingly innocuous words may lead to a privacy violation, and revisions of sensitive text may solve one problem while creating others.

Embodiments of the present invention can represent privacy risk as a term confidence measure and indicate that to the user as a color-coded gradient to highlight words. The higher the term confidence, the more likely someone can infer the sensitive topic from other words in the document. To help the user in identifying terms that are associated with high confidence, the system can indicate such terms with reddish highlights. More generally, the system can use any color-coding scheme which corresponds to term confidence measure.

Embodiments of the present invention can use association rules to measure term confidence. More specifically, the confidence measure $c_s(t)$ is $n_{t,s}/n_t$, where t is one or more terms; s is the sensitive topics, $n_x$ corresponds to the number of documents, in a corpus, which contain one or more terms x. In some embodiments, the corpus can be the world-wide-web and $n_x$ can be computed from the results of queries to a search engine. That is, the search engine can return a count of the number of web sites, web pages, or web documents that contain x.

Prior to determining the confidence of a term, the system can parse text using a sentence detector and part of speech (PoS) tagger. The PoS tagger can link text based on the sentence structure (as derived from PoS information). Terms $t_1$ and $t_2$ are linked for sensitive topic s if $c_s(t_1 \wedge t_2) > \max(c_s(t_1), c_s(t_2))$.

Linking can produce confidence measures that are more intelligible and can improve the efficiency confidence determination by reducing the number of Web queries. For example, while a user might be surprised to see the suggestion that the word "white" be revised when sanitizing a document about George Bush, the user is unlikely to be confused when "white" is linked with "house." In this case, the confidence of the term "white" relative to sensitive topic "George Bush" and "house" relative to sensitive topic "George Bush" are both less than the confidence of the terms "white" AND "house" relative to sensitive topic "George Bush."

The system can search pairs of linked terms that allow the sensitive topic to be inferred by determining pairs of terms for which are linked relative to the sensitive topic. Linking also facilitates the process of determining whether a particular term should be modified by showing the context of other linked terms. For example, the system can display one term with a drop-down menu of linked terms. This drop-down menu enables a user to understand why a certain term is a good candidate for sanitization. For example, "holy mosques" might be linked with sensitive topic "Bin Laden" when paired with "magnate."

The system can display terms with low confidence measure by highlighting such terms in green. This enables the user to obtain a rough assessment of term confidence from color alone. Additionally, the system can display a drop-down menu of linked terms when the user hovers over a particular term. For example, by hovering over the "holy mosques," the user can learn the confidence of the term when it is paired with "magnate." In general, the system can use various interface methods to associate one term with a linked term. When the user clicks the phrase "holy mosques", the system can display an editing window, from which they can view a Web page about Bin Laden that uses those terms.

The system can also use information about entire sentences by including an icon at the start of the sentence, where the icon indicates that the entire sentence can be found on the corpus (i.e. on the world-wide-web) through a clickable link. This embodiment of the present invention can indicate to the user that the information in such a sentence is exactly present on the Web, rather than just likely present based on high-confidence associations with individual terms in the sentence. This indicates that the entire sentence may be need to be reformulated even if every term in it (or every pair of terms in it) have low confidence values relative to the sensitive topic.

Figure 2:
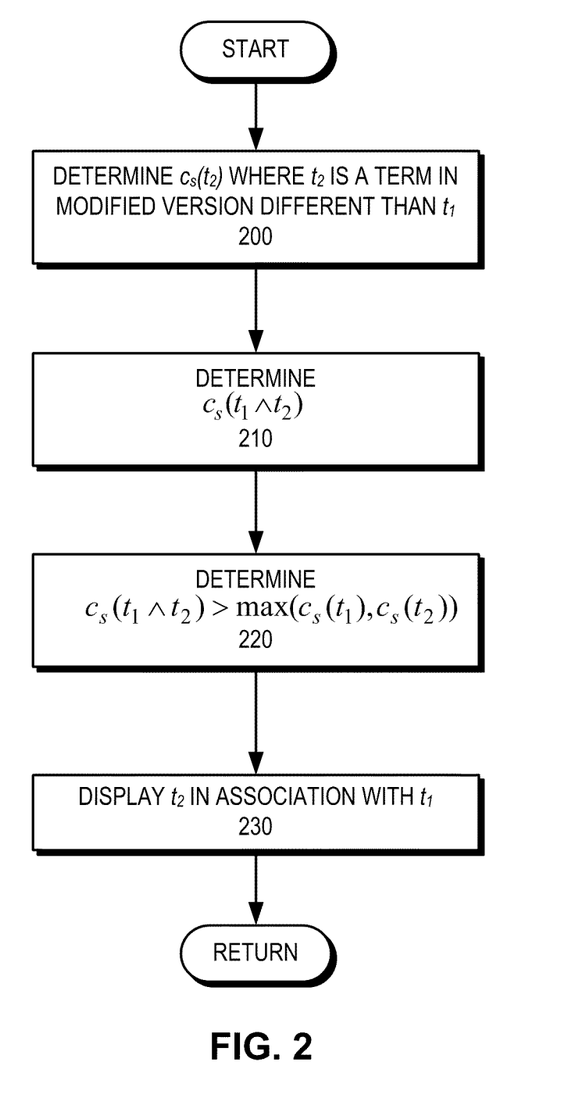
FIG. 2 presents a flow chart illustrating the process of linking of two terms $t_1$ and $t_2$ in accordance with an embodiment.

FIG. 2 presents a flow chart illustrating the process of linking of two terms $t_1$ and $t_2$ in accordance with an embodiment. As FIG. 2 illustrates, the system determines $c_s(t_2)$, where $t_1$ is a term in the document and is different from $t_2$ (operation 200). Next, the system determines $c_s(t_1 \wedge t_2)$ (operation 210). Subsequently, the system determines that $c_s(t_1 \wedge t_2) > \max(c_s(t_1), c_s(t_2))$ (operation 220). Next, the system displays $t_2$ in association with $t_1$ (operation 230). For example, the system can display $t_2$ in a window that appears when the user hovers over $t_1$ in the document. The system can use various display methods to display the association between the terms. The association corresponds to a linkage of the two terms $t_1$ and $t_2$.

User Interface to Facilitate Document Sanitization

Figure 3:
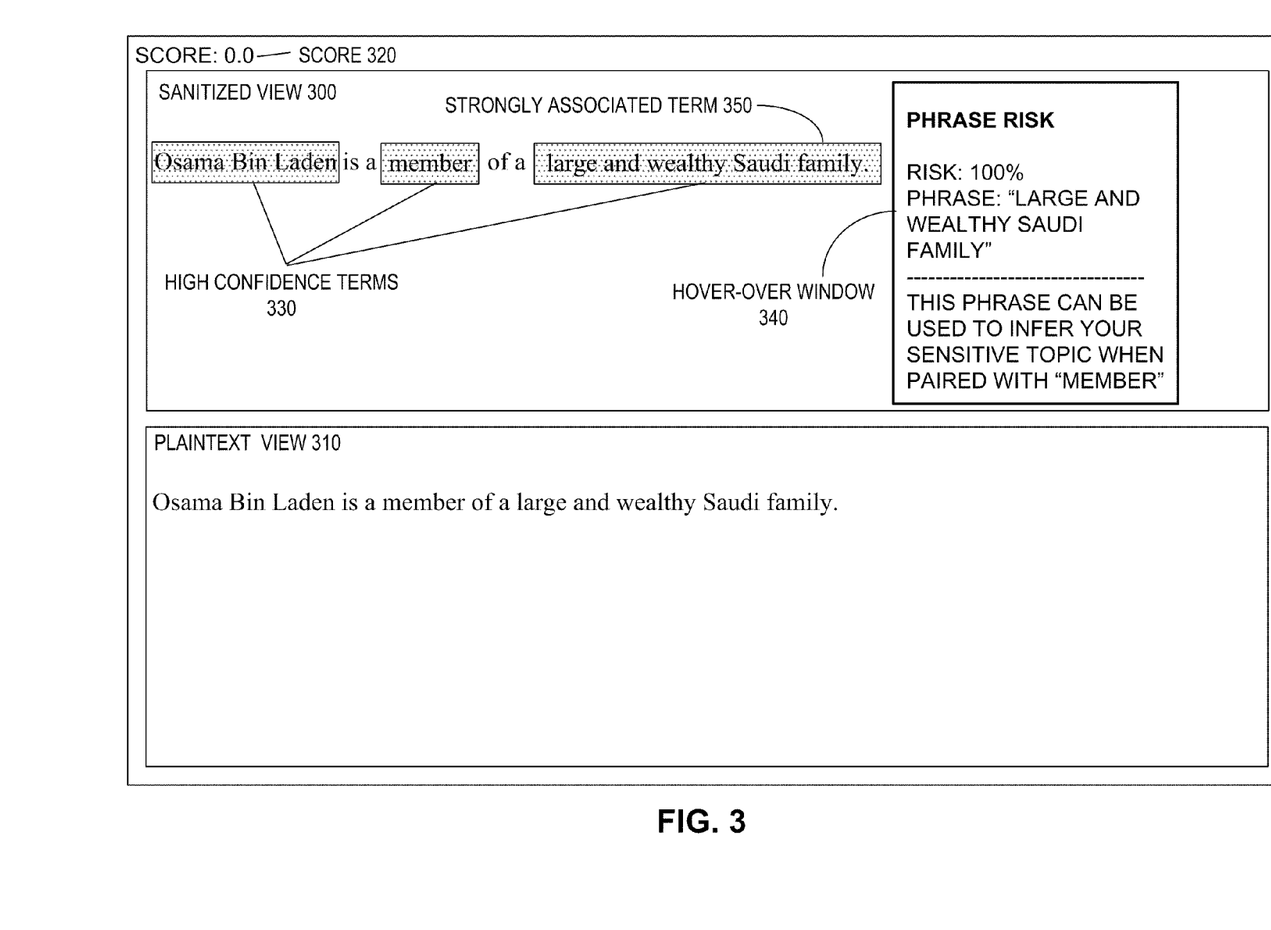
FIG. 3 presents an exemplary screenshot of the process of sanitizing a document in accordance with an embodiment.

FIG. 3 presents an exemplary screenshot of the process of sanitizing a document in accordance with an embodiment. The figure shows a sanitized view 300 and a plaintext view 310 of the text "Osama Bin Laden is a member of a large and wealthy Saudi family." Sanitized view 300 shows the document with terms that have been annotated with sanitization information. In contrast, plaintext view 310 shows the document without annotation. Both views enable the user to visualize how the document has changed relative to sanitization.

In this example, the sensitive topic is "Osama Bin Laden." The figure also shows high confidence terms 330, which are terms with high confidence values. That is, these terms can allow the sensitive topic to be inferred. If the user hovers over strongly associated term 350, the user is presented with hover-over window 340, which provides additional information on the term "large and wealthy Saudi family." In particular, this phrase has a phrase risk (i.e., term confidence) of 100% as related to sensitive topic "Osama Bin Laden." Moreover, this phrase, when coupled with "member" can enable the sensitive topic to be inferred.

High confidence terms 330 are shown as shaded in the figure. In embodiments of the present invention, high confidence terms can be displayed in red gradients (where degree of red varies in proportion to confidence) and low confidence terms can be displayed in green gradients (where degree of green varies in proportion to confidence).

FIG. 3 also shows score 320, which enables the user to determine how well the document sanitization process is proceeding. The following section describes how the system calculates the score.

Determining Document Score

The system can display a score to the user as the user modifies the document. The score can provide a game-like aspect to sanitizing by steering the user towards better sanitization in an enjoyable way. Consistent with the game-like aspect, the score can start at zero and can move higher as privacy risk decreases. To encourage information retention, the score can also move lower if information is removed that is unrelated to the topic. The score encourages the model of substituting sensitive terms with other, less sensitive terms.

In one embodiment of the present invention, the score can be defined as the sum of three components: a change in a risk of the sensitive topic being inferred by the modified version of the document, the risk removal bonus, and the overall deletion penalty. The change in the risk is defined as $$\sum_{o \in O} c_s(o) - \sum_{m \in M} c_s(m),$$

where O is the set of terms in the document and M is the set of terms in the modified version.

The risk removal bonus is defined as $$\sum_{d \in D} c_s(d) - \text{threshold},$$

where D is the set of terms deleted from the document and threshold is a constant. The threshold can be set to $\frac{1}{10}$. Note that the value of $\frac{1}{10}$ defines a threshold for the confidence of a deleted term. If the user replaces a term that has confidence less than $\frac{1}{10}$, the user is, in effect, penalized. On the other hand, the user is, in effect, rewarded for replacing terms with confidence greater than $\frac{1}{10}$.

The overall deletion penalty is defined as min(h, 0), where h is the change in the number of terms. The change in the number terms is the number of terms that have been removed from the document (i.e., the modified version of the document can contain less terms than the document). The overall deletion penalty encourages retention of terms.

Note that the score imperfectly enforces the goal of information retention. For example, user can delete all terms and replace them with the same number of meaningless zero-confidence terms. In general, the system can use other scores. For example, the system can add a bonus for retaining low-confidence terms.

Note that the document itself can be a modified version of the document (i.e., one with zero modifications). Hence, the score for the document itself will be zero.

Various interface methods can be used to indicate the score to the user. For example, the score can be displayed on the upper-left portion of a window displaying the modified version of the document.

Figure 4:
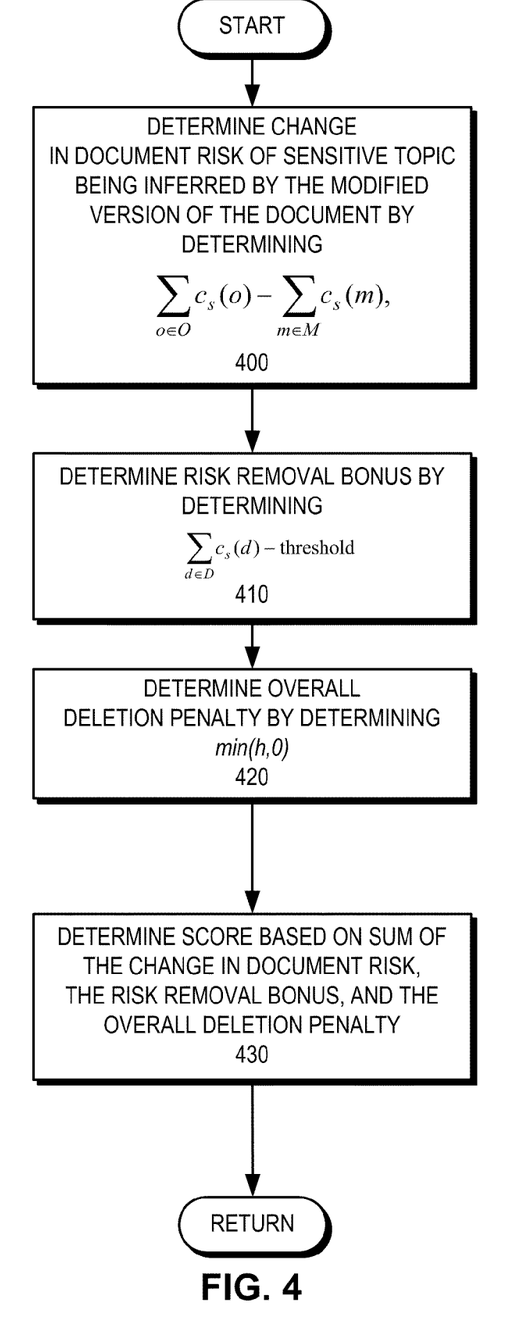
FIG. 4 presents a flow chart illustrating the process of determining an information utility and privacy loss or gain in accordance with an embodiment.
Figure 5:
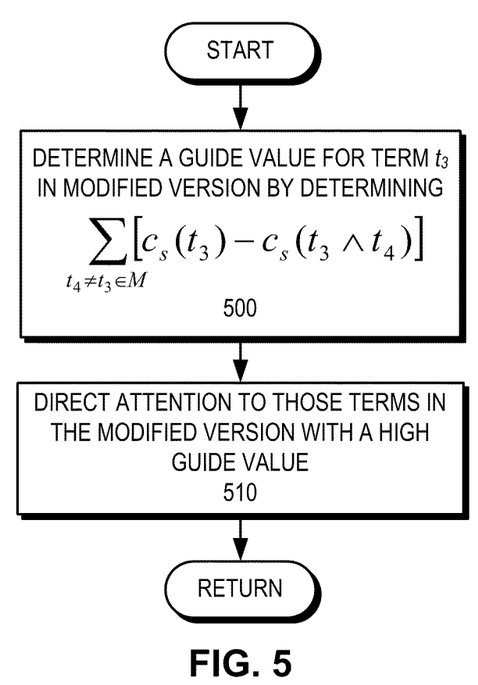
FIG. 5 presents a flow chart illustrating the process of guiding the user to terms that are likely to lead to an improvement in score in accordance with an embodiment.

More generally, the score can be any measure of information utility and privacy loss or gain. The system can use various such measures. FIG. 4 presents a flow chart illustrating the process of determining an information utility and privacy loss or gain for the modified version in accordance with an embodiment. First, the system determines a change in a risk of the sensitive topic being inferred by the modified version of the document by determining $$\sum_{o \in O} c_s(o) - \sum_{m \in M} c_s(m),$$

where O is a set of terms in the document and M is a set of terms in the modified version (operation 400). Next, the system determines risk removal bonus by determining $$\sum_{d \in D} c_s(d) - \text{threshold},$$

where D is the set of terms deleted from the document and threshold is a constant (operation 410). Subsequently, the system determines an overall deletion penalty by determining min(h, 0), where h is the number of terms that have been removed from the document (operation 420). Next, the system determines the score based on a sum of the change in document risk, the risk removal bonus, the overall deletion penalty (operation 430). Note that the score involves determining $c_s(t)$ over all terms t in the document.

Guiding the User and Making Suggestions

The act of sanitizing a document can be daunting if there are a large number of high confidence terms. For example, an interface filled with too many red highlighted terms can lead to information overload because the best action is not clear. To mitigate this, the system can offer the user a "Guide" button, which can suggest current terms that might be worthwhile to sanitize.

As part of the "Guide" button, the system can locate sensitive terms in the document that are likely to cause other terms to become more sensitive when they are used together. For example, the system can guide the user to strongly associated term 350 because this term is strongly associated with sensitive topic "Osama Bin Laden." The system can automatically scroll to such a term in the document and position the cursor on the term without the user having to navigate to that term in the document. The system can use various other methods to indicate a term that is strongly associated with the sensitive topic. The system can also select terms that help users achieve their goal of producing a better-sanitized document, and thus achieve a higher score.

Figure 6:
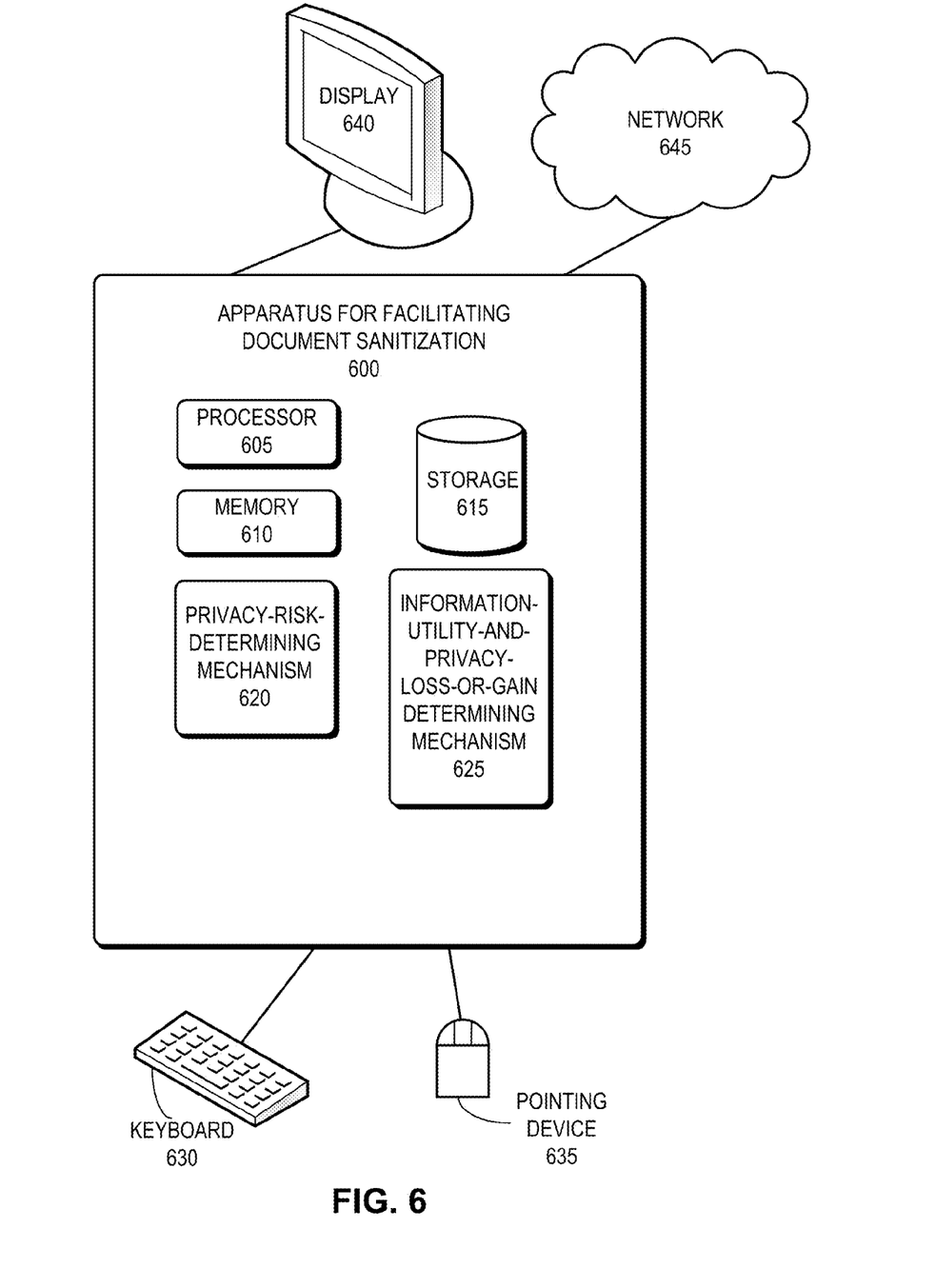
FIG. 6 presents an exemplary apparatus for facilitating sanitizing a modified version of a document relative to sensitive topic s in accordance with an embodiment.

FIG. 6 presents a flow chart illustrating the process of guiding the user to terms that are likely to lead to an improvement in score in accordance with an embodiment. The system determines a guide value for term $t_3$ in the modified version by determining $$\sum_{t_4 \neq t_3 \in M} [c_s(t_3) - c_s(t_3 \wedge t_4)],$$

where M is a set of terms in the modified version (operation 500). Next, the system directs attention to those terms in the modified version which have a high guide value (operation 510). For example, the system can direct attention by scrolling the document to a particular term and moving the cursor onto that term. The system can also color-code such terms with a color other than red or green.

The system can then rank all information in the document from highest to lowest, with the highest being the most beneficial to remove, both in terms of lowering the risk of the document as well as raising the score of the user. Because the term causes many other terms to have higher risk, the term with the highest score will cause the highest reduction in risk possible at that time for sanitizing a single term.

The system can also suggests replacement options for sensitive terms. The system can generate those suggestions through a combination of Google Directory and WordNet®. In particular, if a noun is in WordNet®, the system can provide nouns listed by WordNet as similar, as suggestions. More generally, the system can use any method to determine a hypernym of a term or phrase.

The system can look up proper nouns in Google Directory and a portion of the listing information can be returned to the user. For example, "Tom Cruise" might appear in the category "Actor" which is in turn a part of the category, "Actor and Actresses", etc. The system can exclude the first and last categories (because former is too specific and the latter too general) and offer the rest as revision suggestions.

Apparatus for Facilitating Document Sanitization

FIG. 6 presents an exemplary apparatus 600 for facilitating document sanitization in accordance with an embodiment.

Apparatus 600 for facilitating document sanitization comprises a processor 605, a memory 610, a storage 615, privacy-risk-determining mechanism 620, and information-utility-and-privacy-loss-or-gain-determining mechanism 625, all of which can be in communication with each other through various means.

In some embodiments, mechanisms 620-625 can be part of processor 605. Further, in some embodiments, the system may not include a separate processor and memory. Instead, in addition to performing their specific tasks, mechanisms 620-625, either separately or in concert, may be part of general-purpose computation engines.

Storage 615 stores programs to be executed by processor 605. Specifically, storage 615 stores a program that implements a system (application) for facilitating document sanitization. During operation, the application program can be loaded from storage 615 into memory 610 and executed by processor 605. As a result, apparatus 600 for facilitating document sanitization can perform the functions described above. Apparatus 600 for facilitating document sanitization can be coupled to optional display 640, keyboard 630, pointing device 635, and network 645, which can include the internet.

In an embodiment, processor 605 activates privacy-risk-determining mechanism 620 and supplies it with the term and the sensitive topics. Next, processor 605 activates information-utility-and-privacy-loss-or-gain-determining mechanism 625 and supplies it with the sensitive topics.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing cod and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating sanitizing a modified version of a document relative to one or more sensitive topics, wherein the computer includes a processor, the method comprising:

obtaining a document and a modified version of the document;

determining, by the processor, a privacy risk for a term in the modified version relative to the sensitive topic(s), wherein the privacy risk measures the extent to which the sensitive topics can be inferred based on the term, wherein determining the privacy risk for the term comprises determining a confidence measure cs(t1) for a term t1 in the modified version of the document relative to sensitive topics s; and displaying via a user interface an information utility and a privacy loss or gain for the modified version, wherein the information utility indicates the extent to which the document has changed and the privacy loss or gain indicates the extent to which the modified version is reduced in sensitivity relative to the document, based on the privacy risk;

wherein t1 ranges over the terms in the document;

wherein cs(t1) indicates a ratio of a first number of documents, in a corpus, that contain t1 and s, to a second number of documents in the corpus that contain t1,; and wherein the privacy risk is associated with the cs(t1) values.

2. The method of claim 1, further comprising:

determining cs(t2), wherein t2 is a term in the modified version different from t1;

determining cs (t1^t2); and determining that cs (t1^t2) >max(cs (t1), cs(t2)).

3. The method of claim 1, wherein indicating the information utility and privacy loss or gain comprises:

determining a change in a risk of the sensitive topic being inferred by the modified version of the document by determining $$\sum_{o \in O} c_s(o) - \sum_{m \in M} c_s(m),$$

wherein O is a set of terms in the document and M is a set of terms in the modified version;

determining a risk removal bonus by determining $$\sum_{d \in D} c_s(d) - \text{threshold},$$

wherein D is the set of terms deleted from the document and threshold is a constant;

determining an overall deletion penalty by determining min(h, 0), where h is the number of terms that have been removed from the document;

determining a score based on a sum of the change in the risk, the risk removal bonus, and the overall deletion penalty, wherein determining the score involves determining cs(t) over all terms in the document.

4. The method of claim 1, further comprising highlighting t1 in the modified version with a color gradient which varies in proportion to cs(t1).

5. The method of claim 1, further comprising:
determining a guide value for term t in the modified version by determining $$\sum_{t_4 \ne t_3 \in M} [c_s(t_3) - c_s(t_3 \wedge t_4)],$$

where M is a set of terms in the modified version; and
directing attention to those terms in the modified version which have a high guide value.

6. The method of claim 1, wherein the corpus comprises web pages.

7. The method of claim 1, further comprising:
determining a hypernym for a term in the modified version; and
suggesting the hypernym as a replacement for the term.

8. A non-transitory computer-readable storage device storing instructions that when executed by a computer cause the computer to perform a method for facilitating sanitizing a modified version of a document relative to one or more sensitive topics, the method comprising:
obtaining a document and a modified version of the document;
determining a privacy risk for a term in the modified version relative to the sensitive topic(s), wherein the privacy risk measures the extent to which the sensitive topics can be inferred based on the term, wherein determining the privacy risk for the term comprises determining a confidence measure cs(t1) for a term t1 in the modified version of the document relative to sensitive topics; and
displaying via a user interface an information utility and a privacy loss or gain for the modified version, wherein the information utility indicates the extent to which the modified version has changed and the privacy loss or gain indicates the extent to which the modified version is reduced in sensitivity relative to the document, based on the privacy risk;
wherein t1 ranges over the terms in the document;
wherein cs(t1) indicates a ratio of a first number of documents, in a corpus, that contain t1 and s, to a second number of documents in the corpus that contain t1,; and
wherein the privacy risk is associated with the cs(t1) values.

9. The device of claim 8, further comprising:
determining cs(t2), wherein t2 is a term in the modified version different from t1;
determining cs(t1^t2); and
determining that cs(t1^t2) >max(cs(t1), cs(t2)).

10. The device of claim 8, wherein determining the information utility and privacy loss or gain is based on determining a score comprising:
determining a change in document risk by:
determining a change in a risk of the sensitive topic being inferred by the modified version of the document by determining $$\sum_{o \in O} c_s(o) - \sum_{m \in M} c_s(m),$$

wherein O is a set of terms in the document and M is a set of terms in the modified version;
determining a risk removal bonus by determining $$\sum_{d \in D} c_s(d) - \text{threshold},$$

wherein D is the set of terms deleted from the document and threshold is a constant;
determining an overall deletion penalty by determining min(h, 0), where h is the number of terms that have been removed from the document;
determining a score based on a sum of the change in the risk, the risk removal bonus, and the overall deletion penalty, wherein determining the score involves determining cs(t) over all terms t in the document.

11. The device of claim 8, the method further comprising highlighting t1 in the modified version with a color gradient which varies in proportion to cs(t1).

12. The device of claim 8, wherein the method further comprises:
determining a guide value for term t3 in the modified version by determining $$\sum_{t_4 \ne t_3 \in M} [c_s(t_3) - c_s(t_3 \wedge t_4)],$$

where M is a set of terms in the modified version; and
directing attention to those terms in the modified version which have a high guide value.

13. The device of claim 8, wherein the corpus comprises web pages.

14. The device of claim 8, further comprising:
determining a hypernym for a term in the modified version; and
suggesting the hypernym as a replacement for the term.

15. An apparatus for facilitating sanitizing a modified version of a document relative to one or more sensitive topics, comprising:
a processor;
a memory;
wherein the apparatus is configured to:
obtain a document and a modified version of the document;
determine a privacy risk for a term in the modified version relative to the sensitive topic(s), wherein the privacy risk measures the extent to which the sensitive topics can be inferred based on the term, wherein determining the privacy risk for the term comprises determining a confidence measure cs(t1) for a term t1 in the modified version of the document relative to sensitive topics s; and
display an information utility and a privacy loss or gain for the modified version, wherein the information utility indicates the extent to which the modified version has changed and the privacy loss or gain indicates the extent to which the modified version is reduced in sensitivity relative to the document, based on the privacy risk;
wherein t1 ranges over the terms in the document;
wherein cs(t1) indicates a ratio of a first number of documents, in a corpus, that contain t1 and s, to a second number of documents in the corpus that contain t1; and wherein the privacy risk is associated with the cs(t1) values.

16. The apparatus of claim 15, wherein while determining the privacy risk for the term, the privacy-risk-determining mechanism is further configured to:
   determine cs(t2), wherein t2 is a term in the modified version different from t1;
   determine cs(t1^t2); and
   determine that cs(t1^t2) >max(cs(t1), cs(t2)).

17. The apparatus of claim 15, wherein the indication mechanism is further configured to:
   determine a change in a risk of the sensitive topic being inferred by the modified version of the document by determining $$\sum_{o \in O} c_s(o) - \sum_{m \in M} c_s(m),$$

wherein O is a set of terms in the document and M is a set of terms in the modified version;
   determine a risk removal bonus by determining $$\sum_{d \in D} c_s(d) - \text{threshold},$$

wherein D is the set of terms deleted from the document and threshold is a constant;
   determine an overall deletion penalty by determining min (h, 0), where h is the number of terms that have been removed from the document;
   determine a score based on a sum of the change in the risk, the risk removal bonus, and the overall deletion penalty, wherein determining the score involves determining cs(t) over all terms t in the document.

18. The apparatus of claim 15, wherein the indication mechanism is further configured to highlight t1 in the modified version with a color gradient which varies in proportion to cs(t1).

19. The apparatus of claim 15, wherein the indication mechanism is further configured to:
   determine a guide value for term t3 in the modified version by determining $$\sum_{t_4 \neq t_3 \in M} [c_s(t_3) - c_s(t_3 \wedge t_4)],$$

where M is a set of terms in the modified version; and
   direct attention to those terms in the modified version which have a high guide value.

20. The apparatus of claim 15, wherein the corpus comprises web pages.

21. The apparatus of claim 15, wherein the indication mechanism is further configured to:
   determine a hypernym for a term in the modified version; and
   suggest the hypernym as a replacement for the term.

* * * * *